Aug. 22, 1933.　　　　W. ELSER　　　　1,924,030
CONVERTIBLE AUTOMOBILE BODY
Filed Oct. 9, 1931　　　3 Sheets-Sheet 1
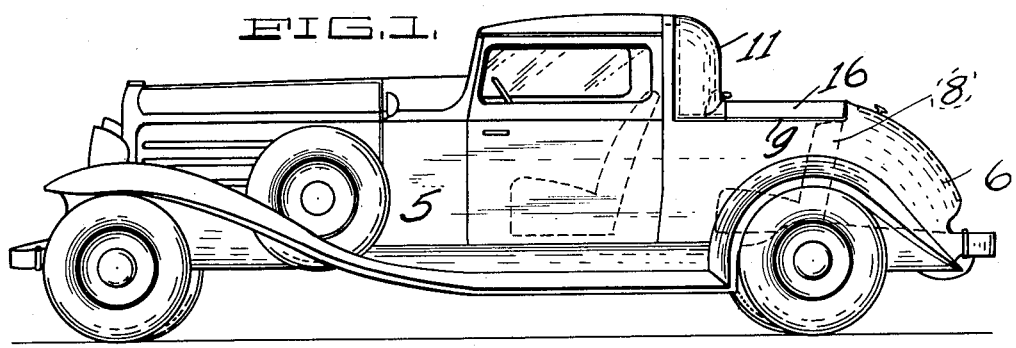
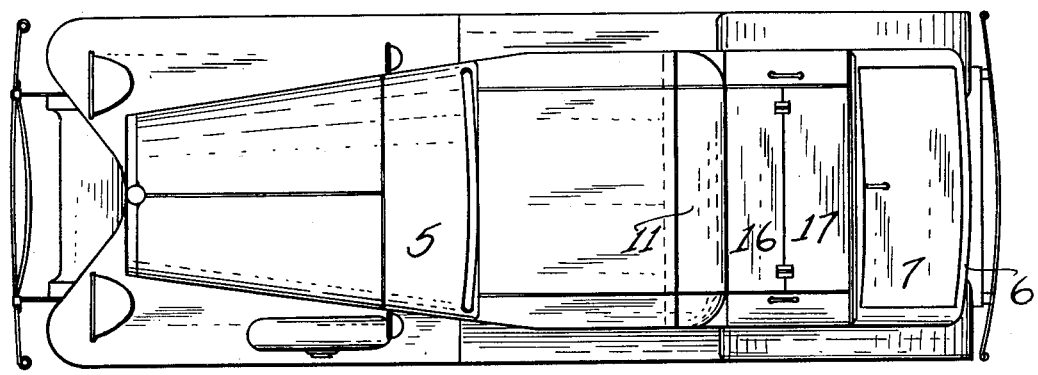
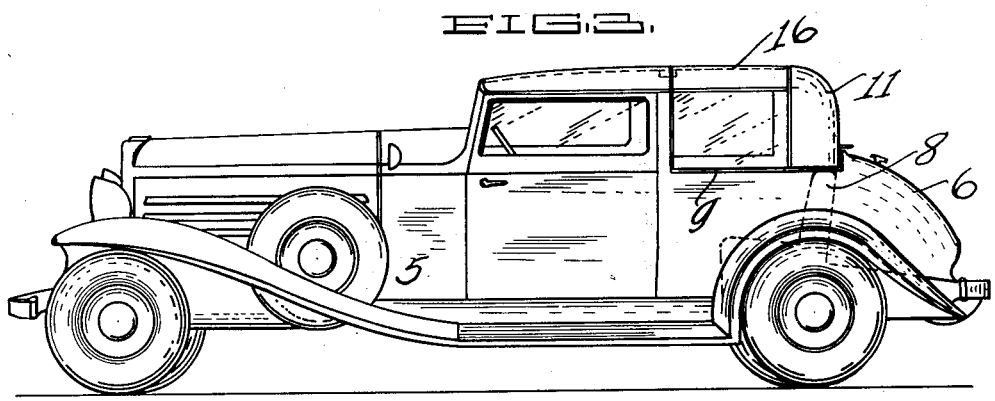
INVENTOR.
WILLIAM ELSER.
BY Victor J Evans & Co
ATTORNEYS.

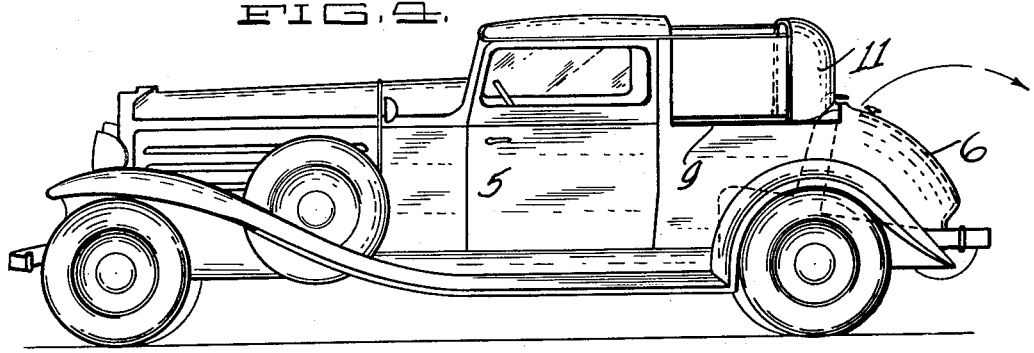
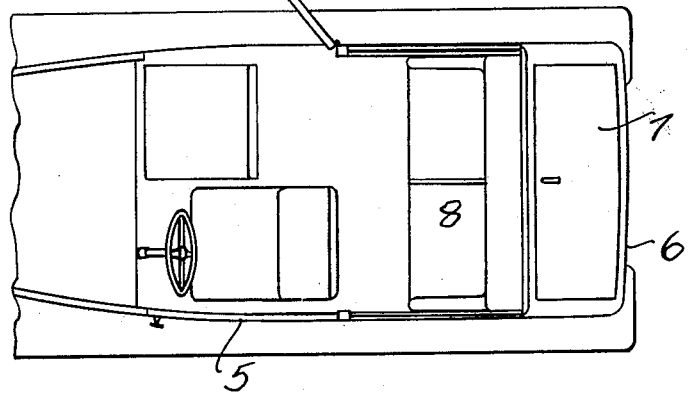
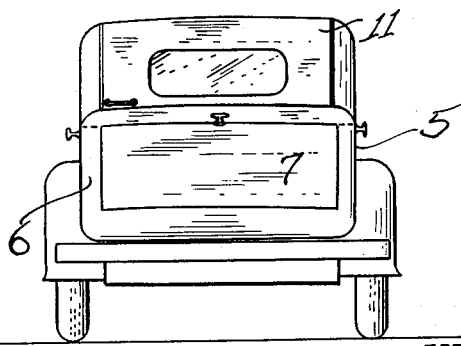

Aug. 22, 1933.  W. ELSER  1,924,030
CONVERTIBLE AUTOMOBILE BODY
Filed Oct. 9, 1931   3 Sheets-Sheet 3
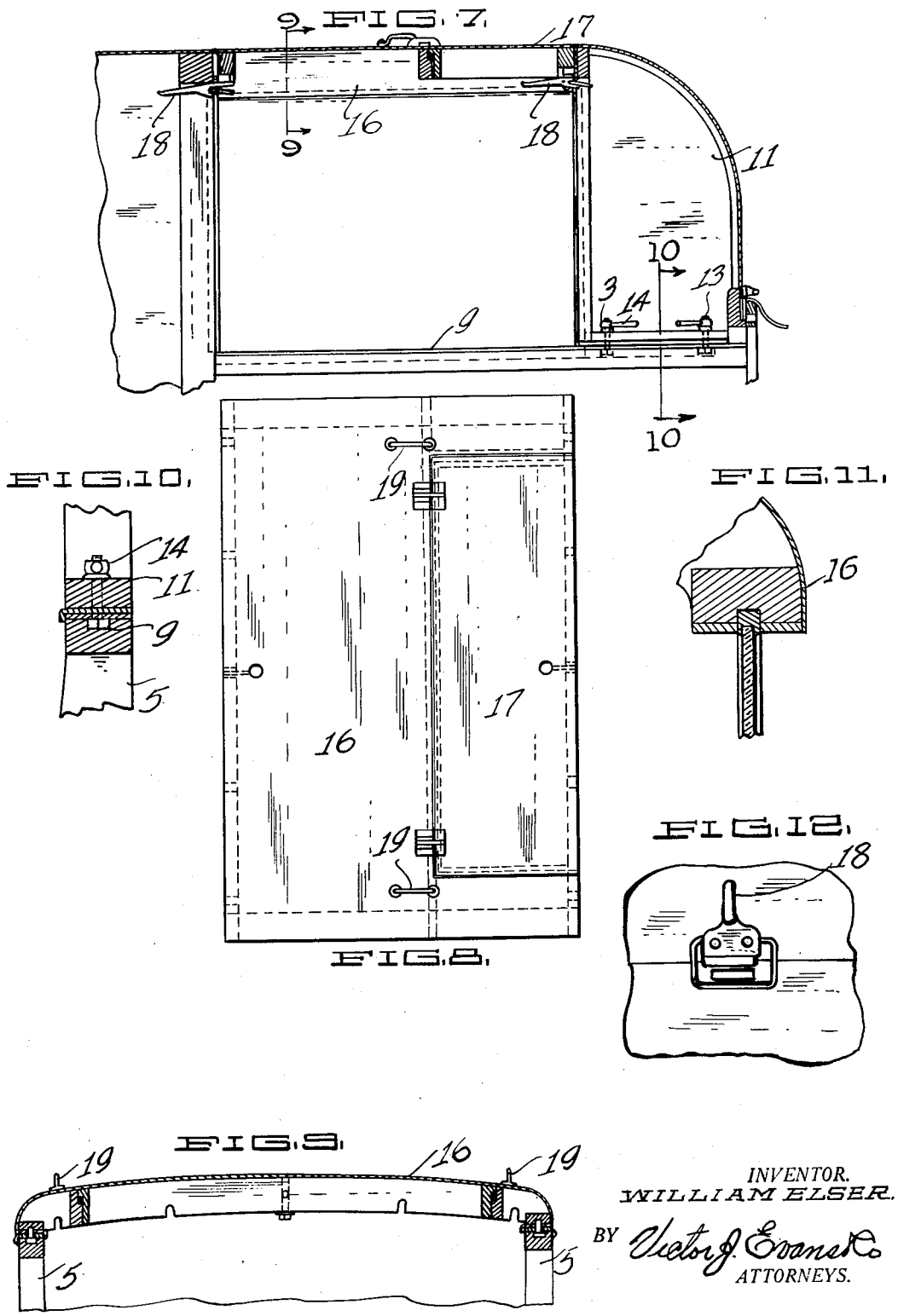
INVENTOR.
WILLIAM ELSER.
BY Victor J. Evans Co
ATTORNEYS.

Patented Aug. 22, 1933

1,924,030

UNITED STATES PATENT OFFICE 1,924,030

CONVERTIBLE AUTOMOBILE BODY

William Elser, San Francisco, Calif.

Application October 9, 1931. Serial No. 567,907

1 Claim. (Cl. 296—99)

This invention relates to improvements in automobiles and has particular reference to the body of a motor vehicle.

The principal object of this invention is to provide an automobile body wherein the same may be readily converted from a coupé to a sedan, and at the same time maintaining the customary appearance of either of the two vehicles.

A further object of the invention is to produce a device which is neat in appearance.

A further object is to produce a device which is economical to manufacture, and therefore one which will not materially add to the cost of the vehicle.

A still further object is to produce a device wherein the parts will be rigidly held against movement which would result in a rattle, squeaks, etc.

Other objects and advantages will be apparent during the course of the following description.

In the accompanying drawings forming a part of this specification and in which like numerals are employed to designate like parts throughout the same, Fig. 1 is a side elevation of my vehicle body as the same would appear when used as a coupé, Fig. 2 is a top plan view of Fig. 1, Fig. 3 is a side elevation of the vehicle body as the same would appear when converted into a closed sedan, Fig. 4 is a view similar to Fig. 3, showing a portion of the top removed so as to have an open sedan, Fig. 5 is a fragmentary top plan view showing the seating elements, Fig. 6 is a rear view of Fig. 4, Fig. 7 is an enlarged fragmentary detail view showing the manner of securing the convertible portion of my vehicle, Fig. 8 is a top plan view of the cover panel, Fig. 9 is a cross sectional view taken on the line 9—9 of Fig. 7, Fig. 10 is a cross sectional view taken on the line 10—10 of Fig. 7, Fig. 11 is a fragmentary detail showing the manner in which the windows fit the cover panel, and Fig. 12 is a detail of a possible locking arrangement for holding certain parts together.

There are many times when it is desirable to have either a coupé or a sedan, but owing to the cost of a motor vehicle, many families do not feel that they can have two cars and therefore applicant has designed a body, which body may be quickly converted from a sedan to a coupé or vice versa.

In the accompanying drawings wherein for the purpose of illustration is shown a preferred embodiment of my invention, the numeral 5 designates the motor vehicle body as a whole, which is of conventional design from the radiator to and including a line passing through the vehicle directly back to the driver's seat. The rear portion of the vehicle is reconstructed so as to accomplish my object. A luggage compartment is shown at 6, which compartment is entered through a door 7. Directly in front of this compartment is positioned a rear seat 8, and by viewing Figs. 1 and 2 it will be noted that this rear seat has its upper extremity below the level of the parting line 9. This parting line serves as a sill upon which is slidably positioned, a cowl 11. The construction of this cowl is best illustrated in Fig. 7, where it will be noted that the same is held to the sills through the medium of bolts 13 upon which are secured clamps 14. Grooves are formed in the top of the sills, which permits the lower end of the bolts to slide in the grooves. It is through this arrangement that the cowl may be moved from the position of Fig. 1 to the position of Figs. 3 and 4. In order to close the space between the cowl, when it is either in the forward position or rearward position, I provide a cover panel 16. This cover panel has a trap door 17 formed therein, the purpose of which will be later seen.

When the cowl is in the position of Fig. 1, the cover panel occupies a position between the bottom of the cowl and the baggage space, and by viewing Fig. 2, it will be noted that the trap door 17, when in this position, if swung open, would overlie the seat 8 and give access thereto, so that the rear seat 8 could be used as a rumble seat, if desired. When the cowl is moved from the position of Fig. 1 to Fig. 2 it is first necessary to remove the cover panel, thence move the cowl backward and the cover panel may now be employed to fill the space between the body and the cowl, as illustrated in Fig. 3, thus forming a roof for the sedan.

Any suitable clamping means may be employed such as that illustrated at 18 for holding the panel to the vehicle body and to the cowl. Should it be desired to have the rear seat open, then the panel may be stored in the luggage compartment. Suitable handles 19 are used upon the cover panel in order to facilitate the handling of the same.

It will thus be seen by this arrangement I have accomplished the converting of a motor vehicle body in such a manner that I have either an open or closed sedan or a coupé with a completely protected rumble seat available for use, if desired.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, the combination of a motor vehicle, comprising a body, a driver's compartment and a rear seat, of a pair of sills formed on said body, a cowl slidable longitudinally on said sills, means for locking said cowl in adjusted position on said sills, and a cover panel positioned on said sills and overlying said rear seat, said cover panel having securing means attached thereto whereby said panel may be elevated above said sills to a position parallel with its first position, to form a roof panel whereby the appearance of said body may be converted from a coupé to a sedan.

WILLIAM ELSER.